US008326273B2

(12) United States Patent
Shang et al.

(10) Patent No.: US 8,326,273 B2
(45) Date of Patent: Dec. 4, 2012

(54) SYSTEM AND METHOD FOR PLAYING A COLOR RING BACK TONE BASED ON THE CALLED USER'S STATE PRESENCE INFORMATION

(75) Inventors: Guoqiang Shang, Shenzhen (CN); Anbin Hu, Shenzhen (CN); Jin Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 216 days.

(21) Appl. No.: 12/063,534

(22) PCT Filed: Aug. 18, 2005

(86) PCT No.: PCT/CN2005/001288
§ 371 (c)(1),
(2), (4) Date: Mar. 2, 2010

(87) PCT Pub. No.: WO2007/019729
PCT Pub. Date: Feb. 22, 2007

(65) Prior Publication Data
US 2010/0151824 A1    Jun. 17, 2010

(51) Int. Cl.
*H04M 1/66* (2006.01)
*H04W 4/00* (2009.01)

(52) U.S. Cl. .................. 455/414.1; 379/82; 379/207.16

(58) Field of Classification Search .......... 455/411–417, 455/435.1–435.3, 466; 379/88, 142, 418
See application file for complete search history.

(56) References Cited

U.S. PATENT DOCUMENTS

| 7,620,160 | B2* | 11/2009 | Tidwell et al. | 379/88.25 |
|---|---|---|---|---|
| 2004/0120493 | A1* | 6/2004 | Creamer et al. | 379/207.08 |
| 2004/0132435 | A1* | 7/2004 | No et al. | 455/414.1 |
| 2005/0117726 | A1* | 6/2005 | DeMent et al. | 379/142.01 |
| 2005/0159146 | A1 | 7/2005 | Lee | |
| 2006/0153355 | A1 | 7/2006 | Wang et al. | |

(Continued)

FOREIGN PATENT DOCUMENTS

WO    00/49793 A1    8/2000

(Continued)

OTHER PUBLICATIONS

3GPP2 Specification, four pages, Jun. 9, 1999.
European Patent Office, Extended European Search Report for EP Application No. EP 05774482 (PCT/CN2005/001288) dated Sep. 27, 2010.

*Primary Examiner* — Kamran Afshar
*Assistant Examiner* — Kashif Siddiqui
(74) *Attorney, Agent, or Firm* — Bright IP Law Offices

(57) ABSTRACT

A system for playing a color ring back tone (CRBT) based on a user's state presence information including the network element devices of: a HLR, a calling user's MSC/VLR, a called user's MSC/VLR, a CRBT control server, and a state presence server. A method for playing a CRBT based on a user's state presence information includes: providing a state presence server in a communication system which includes a CRBT control server; establishing a physical connection channel, and defining an information interface between the CRBT control server and the state presence server; the CRBT control server obtaining the called user's current state information by exchanging information through the information interface; and the CRBT control server playing a corresponding CRBT based on the current state information of the called user and corresponding subscription information of the color ring back tone service when the user is called. Thus, the CRBT control server can play the CRBT based on a playing priority earlier defined by the called user.

9 Claims, 2 Drawing Sheets

U.S. PATENT DOCUMENTS

| | | | |
|---|---|---|---|
| 2006/0210033 A1* | 9/2006 | Grech et al. | 379/88.19 |
| 2007/0218877 A1* | 9/2007 | Mills | 455/414.1 |
| 2007/0291931 A1* | 12/2007 | DeMent | 379/418 |
| 2008/0037740 A1* | 2/2008 | Yoakum et al. | 379/142.01 |

FOREIGN PATENT DOCUMENTS

| | | |
|---|---|---|
| WO | 2004/021690 A1 | 3/2004 |
| WO | 2004/102940 A1 | 11/2004 |

* cited by examiner

SYSTEM AND METHOD FOR PLAYING A COLOR RING BACK TONE BASED ON THE CALLED USER'S STATE PRESENCE INFORMATION

FIELD OF THE INVENTION

The present invention relates to a system and method for value-added services in the communications field (including mobile communications and wired communications), particularly relating to a system and a method in the communications field for playing a color ring back tone based on a called user's state presence information.

BACKGROUND OF THE INVENTION

Color ring back tone service ("CRBT" service) refers to a service utilized by telephone subscribers. The called user creates relevant settings, so that when others call his or her number, before the called user (i.e. the MT (Mobile Terminal)) answers the call, the system will play a piece of music, advertisement or the message left by the called user to a calling user (i.e. MO (Mobile Originator)) according to the called user's relevant setting. What the caller hears is no longer the dull ring-back tone of "toot, toot" as is commonly heard, but instead the caller hears the ring back tone previously set by the called user in the system, i.e., the color ring back tone. What needs to be pointed out is that the personalized color ring back tones are set by the called user in advance, which may be a ring or music provided by the system, a voice message recorded by the called user through an intelligent network system in advance, or a voice message downloaded by the called user to the intelligent network system from the network in advance. Since the development of the color ring back tone service, color ring back tones have become very popular with users, and so operators, content providers, service providers and solution settlement device providers have devoted a great amount of manpower and material resources to the service. Accordingly, this field offers strong support to the development of this service, and this field has also presented a number of valuable reference designs and solutions, such as how to let users set their color ring back tones, what content users can set, and how to maximize the users' personalities. Meanwhile, this service has led to cooperation with the service providers and content providers, and the service has become basically accepted by the operators and providers after repeated amendments and commercialization. Accordingly, the commercialization has lead to wide use and popularity of the color ring back tone service. Not only are mobile operators deploying color ring back tone service, but wired (i.e., landline) operators are also deploying a corresponding service, and even personal handyphone systems are deploying the color ring back tone service. It is evident that this value-added service is widely favored by users and operators.

With the development of communication technology, especially the development of the technology and value-added services in the mobile communication field, network structures have been changed to support various kinds of value-added services. For example, the IP multimedia subsystem (IMS) is enhanced to integrate existing networks in order to provide enough network capacity to support new value-added services. Both mobile operators and the wired operators hope to improve their profits and the average revenue per user (ARPU) value through the value-added services, therefore, the saying of "service is the king" has emerged. After several years' development, the color ring back tone service has been widely accepted, allowing users to express their mood or feelings to a certain extent through the color ring back tone, even though it is not a manner of face-to-face expression. Because of this characteristic, users love the color ring back tone service very much. Therefore, there exists a key problem in further developing the existing color ring back tone service to make more users accept the color ring back tone service and develop new attributes of the color ring back tone, to extend lifecycle of the service, and introduce new innovation.

BRIEF SUMMARY OF THE INVENTION

In view of the above description, the purpose of the present invention lies in providing a system and a method in the communications field for playing a color ring back tone based on a user's state presence information (i.e., the state of the call-receiving user, such as busy, available, or the mood or feelings of the user). In this new color ring back tone service, a state presence server is used to fully realize the potential for increasing the additional value of the color ring back tone service and enrich the color ring back tone service.

In order to achieve the above purposes, a system for playing a color ring back tone based on the called user's state presence information according to the present invention comprises the following network element devices: a home location register (HLR), a calling user's mobile switching center/visiting location register (MSC/VLR), a called user's MSC/VLR, and a color ring back tone control server, wherein the HLR and the calling/called user's MSC/VLR are common network element devices in the communication center, the system further comprising a state presence server.

Additionally, the HLR is a user HLR in the mobile communication network that stores the personal information of the user, for example, the international mobile subscriber identity (short for IMSI), mobile station integrated services digital network (hereinafter MSISDN) number, and personal information such as location and subscription information, etc.

The calling/called user's MSC/VLR accomplishes functions such as establishing a calling circuit, connecting, playing the ring back tone, and disconnecting during the process of making a call. The MSC/VLR also interacts information with the HLR through the signaling of the mobile intelligent network signaling protocol (CAMEL Application Part, hereinafter CAP), obtains the subscription information of the color service of the user, and triggers the color ring back tone service of the CRBT control server.

Additionally, there is a physical connection channel and an information interface between the CRBT control server and the state presence server.

Through the interaction of the CAP signaling with the calling/called user's MSC/VLR, the CRBT control server controls the user's calling process and accomplishes loading and performing the color ring back tone service logic, storing, inquiring and modifying the CRBT user data, etc. The color ring back tone service can address a home independent peripheral (IP) according to the ring back tone information set by users, and play a certain ring back tone.

The state presence server is primarily used to obtain and provide the dynamic information of CRBT users or devices and accomplish the integrated application with the CRBT control server, wherein the dynamic information of the CRBT users or devices comprises state information, location information, and capabilities and preference information, etc.

In order to achieve the above purposes, the method for playing a color ring back tone based on a user's state presence information according to the present invention comprises the following steps:

Step 1: providing a state presence server in a communication system which includes a CRBT control server, wherein the state presence server is constructed to operate according to the standards such as the open mobile alliance (OMA);

Step 2: establishing a physical connection channel and defining an information interface between the CRBT control server and the state presence server;

Step 3: obtaining the called user's current state information in the CRBT control server by interacting with and collecting the above-mentioned information through the information interface; and Step 4: playing the corresponding CRBT on the CRBT control server based on the called user's current state information and corresponding subscription information of the color ring back tone service, when the user is called.

The precondition for performing this method is that the called user has applied or subscribed with the operator for the color ring back tone service, and a state presence service must have CRBTs set for different state presences.

Additionally, in Step 3, the CRBT control server can obtain the called user's current state information by either making an inquiry or being informed by the state presence server.

By adopting the system and the method according to the present invention, the CRBT control server can play the CRBT based on the playing priority defined by the called user, such as playing a color ring back tone based on one or more of a called user's state presence (i.e., the mood or state specified by the receiving call user), based on the calling number, and/or based on the default ring back tone order (i.e., which ring tone will execute first).

In order to clearly and easily understand the features and advantages of the present invention, various embodiments of the invention are provided below which describe the present invention in detail in conjunction with the accompanying drawings.

DETAILED DESCRIPTION OF THE INVENTION

The following is a further detailed description of the present invention in conjunction with the accompanying drawings and embodiments.

Figure 1:
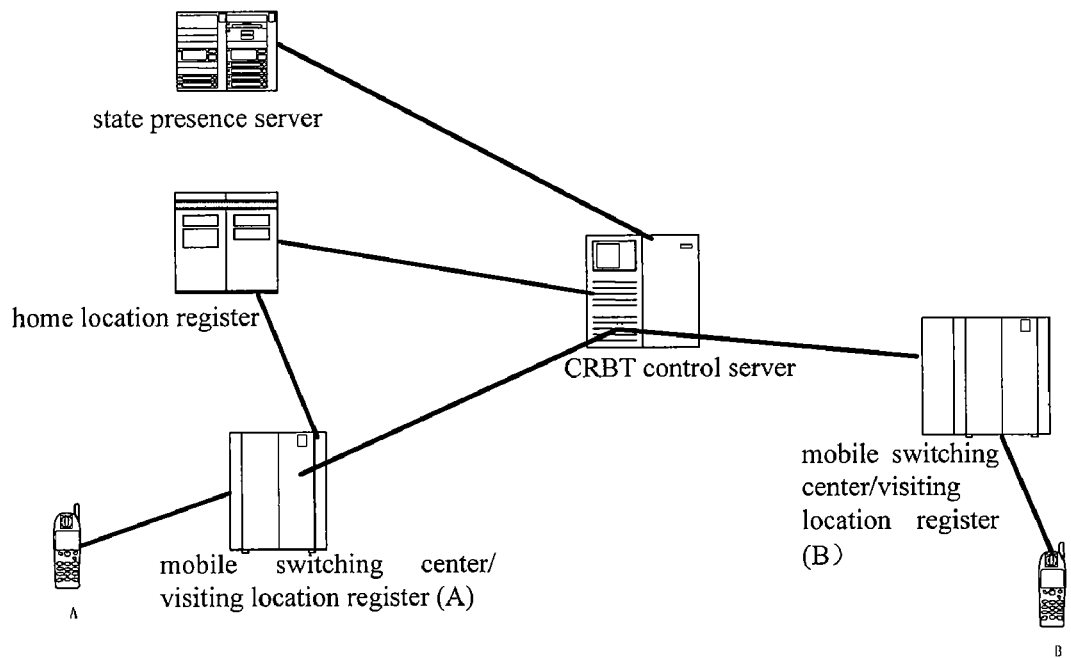
FIG. 1 is a block diagram illustrating the system according to the present invention.

FIG. 1 is a block diagram illustrating the system according to one embodiment of the present invention. As shown in FIG. 1, the system for playing a color ring back tone based on the called user's state presence information according to the present invention comprises the network element devices of: a HLR, a calling user's MSC/VLR, a called user's MSC/VLR, a color ring back tone control server, and a state presence server, wherein the HLR and the calling/called user's MSC/VLR are the common network element devices in a communication network center.

In this system, the HLR is a user HLR in the mobile communication network, and is used for storing the user's personal information, i.e., personal information such as the IMSI, MSISDN, location and subscription service. The HLR is capable of conducting the interaction of the mobile application part (MAP) and CAP signaling with the MSC, CRBT control server, and the like. The HLR can also provide multiple functions such as location inquiry and subscription information inquiry.

The calling/called user's MSC/VLR is used for accomplishing functions such as establishing a calling circuit, connecting the calling circuit, playing the color ring back tone, and disconnecting the calling circuit. The MSC/VLR interacts information with the HLR through the CAP signaling, obtaining the user's subscription information of the color ring back tone service, thus triggering the color ring back tone service of the CRBT control server.

The CRBT control server controls the user's calling process through the interaction of the CAP signaling with the calling/called user's MSC/VLR; when the MSC triggers the color ring back tone service, the CRBT control server interacts information with the HLR through the CAP signaling, obtains the user information in the HLR, provides necessary data for further procession of the color ring back tone service, and accomplishes loading and performing the color ring back tone service logic, and storing, inquiring and modifying the CRBT user's data. The color ring back tone service can address the home IP according to the ring back tone information set by users, thus realizing playing the specific ring back tone.

The state presence server is mainly used to obtain and provide the dynamic information (information such as the state, location and capacity) of CRBT users or devices and to accomplish the integrated application (such as the push to talk over cellular (PoC) service, instant message (IM) service, mobile game, and group management, etc.) with other service application servers. In the present invention, the state presence server is integrated with the CRBT control server, and provides the user's current information through interacting signals, as well as provides necessary information for the CRBT control server to play the CRBT based on the user's subscription information.

Figure 2:
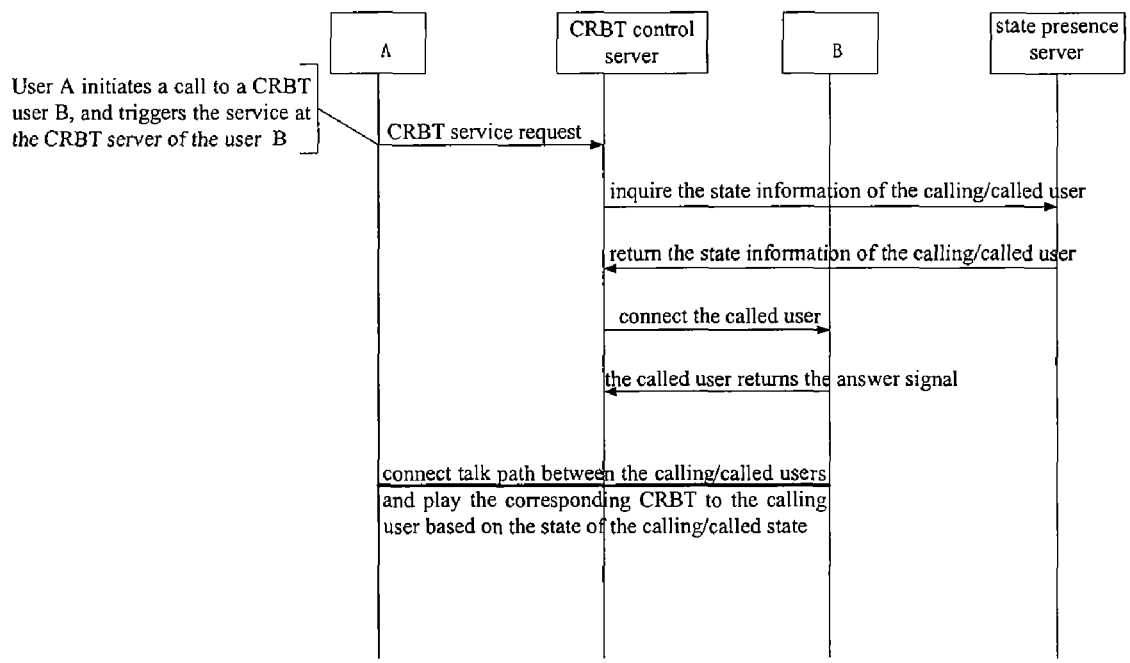
FIG. 2 is a simplified flow chart illustrating the method according to the present invention.

FIG. 2 is a simplified signaling flow chart of the method according to the present invention, depicting the simplified signaling process when a user A (a calling user) makes a call with a user B (a called user) in a normal flow. As shown in FIG. 2, when the user A initiates a call, after a series of signaling interactions with the calling/called user's MSC/VLR and HLR, the CRBT control server is triggered. Then, the CRBT control server sends a state request to the state presence server, the state presence server responds to the request and returns information, and finally the CRBT control server plays the corresponding CRBT based on the returned information.

In conjunction with FIGS. 1 and 2, the method for playing a color ring back tone based on a called user's state presence information according to the present invention comprises the following steps:

Step 1: providing a state presence server in a communication system which includes a CRBT control server, wherein the state presence server can be constructed according to the standards such as the Open Mobile Alliance (OMA).

Step 2: establishing a physical connection channel and defining an information interface between the CRBT control server and the state presence server.

The information interface enables interaction between the state presence server and the CRBT control server, allowing the CRBT control server to inquire the corresponding called user's state information. Alternately, the state presence server can inform the CRBT control server of the called user's state information. This may occur if the CRBT control server sends a request command P2Req(x) to the state presence server through the interface, and the state presence server sends a request response P2Ack(x, y), where x represents the user identification code, y represents the called user's current state presence information, and the state presence information characteristic code is in conformity with the state presence service standard.

Step 3: the CRBT control server utilizes the information interface and obtains the called user's current state information.

Again, the CRBT control server can obtain the called user's current state information by the either inquiring or being informed by the state presence server.

Step 4: the CRBT control server plays the corresponding CRBT based on the called user's current state information and the corresponding subscription information of the color ring back tone service, when the user is called.

As shown in FIG. 2, when the user A initiates a call to user B, and user B is in an standby state, the user A can hear the CRBT set by the user B.

A precondition for executing the method is that the called user, such as the user B shown in FIG. 2, must have a color ring back tone service enabled with his or her phone operator, and the state presence service must have CRBTs set for different state presences that can be specified by the called user.

The above is a detailed description of the working principle of the present invention, intended as an illustrative embodiment for convenience in understanding the invention, and should not be deemed as providing any limitations to the scope of the present invention. Those skilled in the art could make numerous alterations to the disclosed embodiments without departing from the spirit or scope of the inventive subject matter set forth in the specification and claims.

What is claimed is:

1. A system for playing a color ring back tone, comprising:
   a home location register;
   a calling user's mobile switching center/visiting location register;
   a called user's mobile switching center/visiting location register; and
   a color ring back tone control server;
   wherein the home location register, the calling user's mobile switching center/visiting location register, and the called user's mobile switching, center/visiting location register are common network element devices in a communication system, and wherein the communication system includes a state presence server;
   wherein the state presence server is used to obtain and provide dynamic information of color ring back tone users or devices and accomplish an integrated application with the color ring back tone control server, and wherein the dynamic information of color ring back tone users or devices comprises state information, location information and capabilities and user preference information,
   wherein the color ring back tone control server plays one of a plurality of color ring back tones associated with the called user based on a playing priority defined by the called user;
   wherein the playing priority defined by the called user is as follows: a color ring back tone chosen based on the called user's current state information has a playing priority over a color ring back tone chosen based on the calling user's calling number, and a color ring back tone chosen based on the calling user's calling number has a playing priority over a default color ring back tone.

2. The system according to claim 1, wherein the home location register is the called user's home location register in the mobile communication network; and wherein the home location register stores the personal information of the user, the personal information of the user including international mobile user identity, mobile station integrated service digital network number, location, and subscription service.

3. The system according to claim 1, wherein the calling user's mobile switching center/visiting location register and called user's mobile switching center/visiting location register each performs the steps of:
   establishing a calling circuit;
   connecting the calling circuit;
   playing the color ring back tone;
   disconnecting the calling circuit daring calling;
   interacting information with the home location register through signaling via a mobile Intelligent Network protocol;
   obtaining the user's subscription information of the color ring hack tone service; and
   triggering the color ring back tone service at the color ring back tone control server.

4. The system according to claim 3, wherein a physical connection channel and an information interface exists between the color ring back tone control server and the state presence server.

5. The system according to claim 4, wherein the color ring back tone control server controls the user's calling process and accomplishes loading and performing a color ring back time service logic, storing, inquiring and modifying the color ring back tone user's data, through the interaction of the signaling of the mobile Intelligent Network protocol with the calling user's mobile switching center/visiting; location register and the called user's mobile switching center/visiting location register.

6. A method for playing a color ring back tone, comprising the following steps:
   step 1, setting a state presence server in a communication system which includes a color ring back tone control server;
   step 2, establishing, a physical connection channel and defining an information interface between the color ring back tone control server and the state presence server;
   step 3, the color ring back tone control server obtaining a called user's current state information, capabilities and the called user's preference information by interacting information through the information interface; and
   step 4, the color ring back tone control server playing a color ring back tone based on the called user's current state information, capabilities and the called user's preference information, and corresponding subscription information of color ring back tone service, when the user is called,
   wherein the color ring back tone is chosen from a plurality of color ring back tones associated with the called user based on a playing priority defined by the called user,
   wherein the playing priority defined by the called user is as follows: a color ring back tone chosen based on the called user's current state information has a playing priority over a color ring back tone chosen based on a calling user's calling number, and a color ring back tone chosen based on the calling user's calling number has a playing priority over a default color ring back tone.

7. The method according to claim 6, wherein called user previously applies to the operator for a color ring back tone service and a state presence service and sets a plurality of color ring, back tones for different state presences.

8. The method according to claim 6, wherein the color ring back tone control server is capable of inquiring the called user's current state information or being informed by the state presence server.

9. The method according to claim 6, wherein the color ring back tone control server inquires the corresponding user's state information, or the state presence server informs the color ring back tone control server of the user's state information.

* * * * *